(12) United States Patent
Barros, Sr.

(10) Patent No.: US 6,334,630 B1
(45) Date of Patent: Jan. 1, 2002

(54) DEVICE AND METHOD TO PREVENT GRASS BUILDUP ON LAWNMOWER WHEELS

(76) Inventor: Randall C. Barros, Sr., 44 Akin St., Fairhaven, MA (US) 02719-5102

( * ) Notice: Subject to any disclaimer, the term of this patent is extended or adjusted under 35 U.S.C. 154(b) by 0 days.

(21) Appl. No.: 09/610,323

(22) Filed: Jul. 5, 2000

Related U.S. Application Data

(60) Provisional application No. 60/142,952, filed on Jul. 12, 1999.

(51) Int. Cl.$^7$ .................................................. B60S 1/68
(52) U.S. Cl. ..................................... 280/855; 15/256.5
(58) Field of Search .............................. 280/855, 856, 280/158.1; 15/256.5, 256.51, 256.52; 56/17.5, 16.7

(56) References Cited

U.S. PATENT DOCUMENTS

| | | | | |
|---|---|---|---|---|
| 168,675 A | * | 10/1875 | Sage | 280/855 |
| 352,483 A | * | 11/1886 | Moore | 280/855 |
| 602,193 A | | 4/1898 | Neuert | |
| 794,239 A | * | 7/1905 | Maguire | 280/855 |
| 970,277 A | * | 9/1910 | Thomas et al. | 280/855 |
| 1,174,476 A | * | 3/1916 | Cohen | 280/855 |
| 1,688,250 A | * | 10/1928 | Thompson | 280/855 |
| 1,835,273 A | | 12/1931 | Byson | |
| 2,077,919 A | | 4/1937 | Engstrom | |
| 2,157,253 A | | 5/1939 | Yetter | |
| 2,770,469 A | | 11/1956 | Seda | |
| 3,318,432 A | * | 5/1967 | Mullis et al. | 280/855 |
| 4,603,746 A | | 8/1986 | Swales | |
| 4,979,573 A | * | 12/1990 | Williamson | 172/15 |
| 5,290,050 A | * | 3/1994 | Kim | 280/42 |
| 5,524,913 A | | 6/1996 | Kulbeck | |
| 5,542,690 A | | 8/1996 | Kozicki | |
| 5,566,420 A | | 10/1996 | Specht | |
| 5,921,072 A | * | 7/1999 | Cargile | 56/17.5 |

FOREIGN PATENT DOCUMENTS

| | | |
|---|---|---|
| GB | 287565 | 5/1929 |
| GB | 1015565 | 1/1966 |
| GB | 1 483 047 | 8/1977 |

* cited by examiner

Primary Examiner—Brian L. Johnson
Assistant Examiner—Byan Fischmann
(74) Attorney, Agent, or Firm—Richard C. Litman

(57) ABSTRACT

A scraper device is disclosed for preventing irregular release of grass clippings from a wheel of a lawnmower. The scraper device has a scraper with a concave or angled inner surface. The lateral edges of the scraper are separated from the wheel surface by a uniform scraper distance. The length of the scraper is approximately equal to the width of the wheel. The width of the scraper is about ⅙ to ¼ of the diameter of the wheel. An arm attaches the scraper to the housing of the lawnmower adjacent to the wheel. The scraper and the arm are composed of a rigid material such as metal or plastic. As the wheel turns in either the forward or reverse direction, excess grass clippings are removed from the wheel, preventing the formation of clumps. The invention also includes a lawnmower having four attached scraper devices, and a method for improving lawn appearance using the scraper device to remove grass clippings from the wheels.

13 Claims, 3 Drawing Sheets

DEVICE AND METHOD TO PREVENT GRASS BUILDUP ON LAWNMOWER WHEELS

CROSS-REFERENCE TO RELATED APPLICATION

This application claims the benefit of U.S. Provisional Patent Application Serial No. 60/142,952, filed Jul. 12, 1999.

BACKGROUND OF THE INVENTION

1. Field of the Invention

The present invention relates to lawnmowers and lawnmower attachments, and more particularly to a device to prevent grass from building up on lawnmower wheels.

2. Description of Related Art

When lawns are mowed, grass clippings frequently build up on the wheels of the lawnmower. The problem is particularly severe when the grass is damp or when a large area of lawn is mowed. These clippings tend to fall off the wheels in clumps as the mowing progresses. The clumps leave an unsightly trail, giving a sloppy appearance to the lawn. If not raked up, the clumps of clippings can block sunlight and damage the grass beneath them. Clumps of clippings tend to take longer to decompose than evenly spread clippings.

Brushes and scrapers for removing mud and the like from the wheels of tractors, bicycles, automobiles, etc. are well known. Mud is semisolid, typically sticky, and clings tightly to the wheel. In removing mud, it is generally necessary to channel it in a particular direction to avoid redeposition onto the wheel. Grass clippings are fibrous and have characteristics very different from mud. Known brushes and scrapers are not suitable for removing grass clippings from lawnmower wheels. Grass clippings would tend to tangle in the bristles of brushes and would be difficult to remove, since the clippings cannot simply be washed out as mud can. Brushes are also bulky and wear down quickly.

Known scrapers work well for cleaning mud from metal wheels, but are unsuited for cleaning grass from lawnmower wheels. The typical lawnmower wheel is composed of rubber with deep treads for traction on wet grass. Lawnmower wheels are much smaller and lighter than wheels for farm tractors and the like.

The following patents illustrate devices having the above disadvantages.

U.S. Pat. No. 602,193 to Neuert discloses a brush which is mounted on a bicycle tire to clean the tire. The brush has a pair of concave jaws with bristle brushes on the inside. The jaws are connected at one end by a spring which holds the brushes against both sides of the tire. The brush may include a yielding scraper at one end to remove dirt after it has been broken up by the brushes.

U.S. Pat. No. 1,835,273 to Byson teaches a scraper attachment for the front wheels of tractors. The scraper device is attached to the steering axle so that it swings with the wheels. A scraper bar is rigidly fixed in place by a scraper arm secured to the axle. The scraper bar has a scraper member which scrapes mud and foreign matter off the wheels. This prevents the wheels from clogging in muddy fields.

U.S. Pat. No. 2,077,919 to Engstrom discloses a mud scrapes for tractor wheels which can operate in either a forward or reverse direction. The mud scraper has bow-shaped right and left hand supporting members on which front and rear mud scraper blades are mounted.

U.S. Pat. No. 2,157,253 to Yetter teaches a tractor wheel scraper for removing mud and trash from the front wheels of tractors. The scraper blades are gradually curved upwardly and outwardly to conform to the curvature of the sides and tread of the pneumatic tires of the tractor. The blades are secured to plates having openings to accommodate adjusting bolts.

U.S. Pat. No. 2,770,469 to Seda discloses an agricultural implement wheel scraper assembly. The assembly scrapes mud and dirt from the wheels of a farm plow or the like. The assembly includes a curved disc attached to a mounting bar. The disc rotates as the wheel turns, scraping the mud or dirt from the wheel.

U.S. Pat. No. 4,603,746 to Swales teaches a scraper mechanism for a disk blade. The scraper includes a wear ring attached to the rim of a rotary scraper, which is biased toward and in contact with one side of a disk blade. The wear ring is in contact with the wheel.

U.S. Pat. No. 5,524,913 to Kulbeck discloses an in-line roller skate having scrapers for scraping the pneumatic tires of the skate. The scrapers remove mud and rocks.

U.S. Pat. No. 5,542,690 to Kozicki teaches a wheelchair for cleanrooms. The wheelchair has tacky rollers to clean the wheel as the chair rolls.

U.S. Pat. No. 5,566,420 to Specht discloses a device for cleaning snow and other debris from the surface of an automobile tire. A motor inside a housing positions a threaded screw with an associated coupling nut. A brush is secured to the coupling nut and cleans the tire tread.

British Pat. No. 287,565 to Akre discloses a scraper for drying cylinders and rollers in paper making machines. British Pat. No. 1,015,565 to Miag Muehlenbau Und Industrie G.M.B.H discloses a device for scraping rollers in roller mills.

British Pat. No. 1,483,047 to Fearon teaches a device for reducing the amount of mud, small stones, water, or other matter sprayed from the wheels of a motor vehicle. The device includes brush in contact with the tire, with a flap attached to one edge. The flap is composed of a resiliently deformable material and cushions the water hitting the flap, so that water does not spray out to the sides of the tire.

None of the above inventions and patents, taken either singly or in combination, is seen to describe the instant invention as claimed.

SUMMARY OF THE INVENTION

The present invention is a scraper device to prevent irregular release of grass clippings from a wheel of a lawnmower. The scraper device has a scraper with a concave inner surface. The lateral edges of the scraper are separated from the wheel surface by a predetermined, uniform scraper distance. The length of the scraper is approximately equal to the width of the wheel. The width of the scraper is about ⅙ to ¼ of the diameter of the wheel. An arm attaches the scraper to the housing of the lawnmower adjacent to the wheel. The scraper and the arm are composed of a rigid material such as metal or plastic. As the wheel turns in either the forward or reverse direction, grass clippings are removed from the wheel, preventing the formation of clumps. The invention also includes a lawnmower having four attached scraper devices, and a method for improving lawn appearance using the scraper device to remove grass clippings from the wheels.

Accordingly, it is a principal object of the invention to provide a scraper device having a scraper with a concave inner surface and an arm attaching the scraper to a lawnmower housing adjacent to the wheel.

It is another object of the invention to provide a scraper device having a scraper and an arm composed of a rigid material.

It is a further object of the invention to provide a scraper device which prevents irregular release of grass clippings from lawnmower wheels.

Still another object of the invention is to improve the appearance of a lawn by preventing the accumulation of clumps of clippings.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference character s denote corresponding features consistently throughout the attached drawings.

DETAILED DESCRIPTION OF THE PREFERRED EMBODIMENTS

Figure 1:
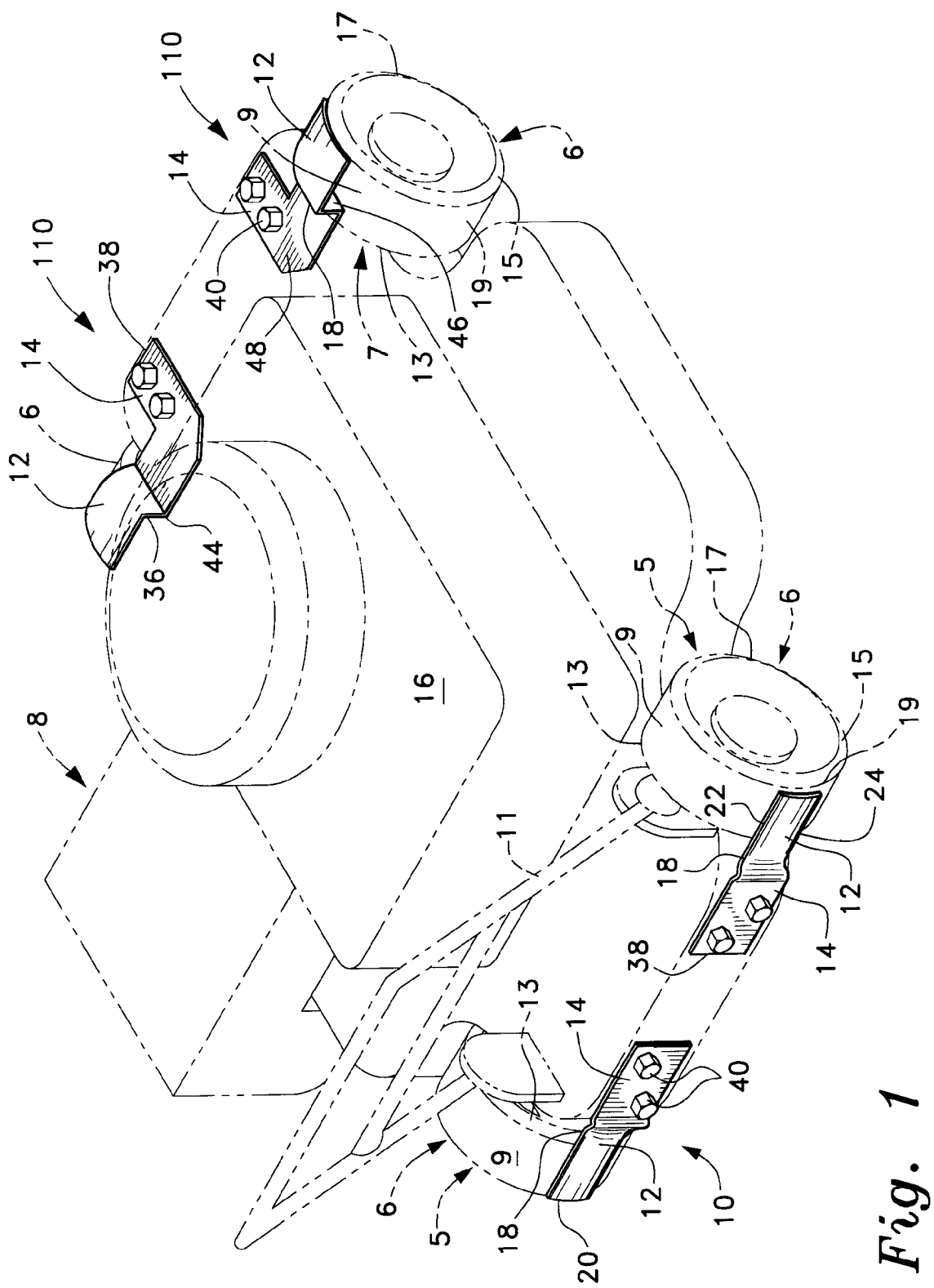
FIG. 1 is an environmental, perspective view of four scraper devices attached to a lawnmower housing adjacent to the wheels.

The present invention is a scraper device 10 or 110 to prevent irregular release of grass clippings from the wheels 6 of a lawnmower 8. FIG. 1 shows a preferred embodiment 110 of the scraper device attached to the lawnmower adjacent the front wheels 7, and an alternate embodiment 10 of the scraper device mounted adjacent the rear wheels 5. Each scraper device has a scraper 12 and an arm 14.

The lawnmower 8 is of conventional design. Each wheel 6 has a wheel surface 9. See FIGS. 1, 4, and 5. Lawnmowers with four wheels are preferred, but two wheels are acceptable. Each wheel 6 has an inner side 13 and an opposite outer side 15. Each wheel also has a leading edge 17 and a trailing edge 19. See FIG. 1 The leading and trailing edges are equidistant from the top and bottom of the wheel. The leading edge is located towards the front of the lawnmower, the trailing edge towards the rear.

Preferably the lawnmower has either a gasoline or electric motor and is designed to cut large areas of grass. The lawnmower may or may not be self-propelled. Preferably the lawnmower 8 has a handle 11 for pushing; however, the scraper device may also be used with riding mowers. The lawnmower has a housing 16, which covers the blades and the motor (if any). The housing 16 extends near the wheels 6, as shown in FIG. 1. The housing typically is constructed of steel, though heavy-duty plastic or other materials may be used.

The scraper 12 is composed of a rigid material, preferably metal or rigid plastic. The optimal material is steel, such as sheet steel. To avoid excess weight and bulk and improve scraping performance, the thickness of the rigid material is preferably less than 1/8 inch (3 mm), ideally about 1/16 inch (1–2 mm). The thickness may taper so that it is slightly less at the lateral edges; however, a taper is not necessary.

The width of the scraper 12 between the lateral edges preferably ranges from about 1/6 to about 1/4 of the diameter of the wheel 6. A scraper which is too wide tends to be overly delicate, and requires additional material to overcome this problem. The result is that the scraper device is heavy and awkward. Greater precision is also required for a wide scraper in manufacturing and installation to maintain a uniform scraper distance. On the other hand, an overly narrow scraper device tends to bend easily and is more likely to catch on objects while mowing.

The scraper 12 has a proximal edge 18, a distal edge 20, a first lateral edge 22, and a second lateral edge 24. See FIGS. 2A, 2B, 3, 4 and 5. The proximal and distal edges 18 and 20 are parallel to each other, and the lateral edges 22 and 24 are parallel to each other. The scraper is preferably constructed from a generally rectangular piece of steel with rounded corners.

The lateral edges generally follow the contour of the wheel surface 9. See FIGS. 1, 4, and 5. Typical lawnmower wheels have a cylindrical wheel surface with straight edges. The lateral edges 22 and 24 therefore are preferably straight, but may be slightly curved if necessary to follow a wheel surface with a curved cross section.

Ideally the scraper 12 is located near the trailing edge 19 of the wheel 6, as in FIG. 1 for embodiment 10. The second lateral edge 24 is preferably located closer to the ground. Preferably the scraper is oriented vertically with the first lateral edge 22 directly above the second lateral edge 24, as in FIG. 1 for embodiment 10. The scraper of embodiment 110 is shown oriented horizontally in FIG. 1; however, preferably the scraper of embodiment 110 is also oriented vertically near the trailing edge of the wheel.

The length of the scraper 12 from the proximal edge 18 to the distal edge 20 is approximately equal to the width of the wheel 6. See FIG. 1. This assures that grass clippings are evenly removed from the entire wheel surface. A longer scraper is likely to protrude beyond the wheel and present a hazard.

The first and second lateral edges 22 and 24 are separated from the wheel surface by a uniform scraper distance. The wheel surface is considered to be the farthest extension of the wheel, or the tread ridges as opposed to the tread grooves. See FIGS. 4 and 5. The lateral edges 22 and 24 do not contact the wheel surface at any point. This prevents the scraper from binding or jamming against the wheel surface, even when the scraper is bumped.

The scraper distance (between the lateral edges 22, 24 and the surface of the wheel) ranges from about 1/16 inch to about 3/8 inch (2–8 millimeters). Preferably the scraper distance is about 1/8 to about 5/16 inch (3–7 mm), most preferably about 3/16 inch (5 mm). A typical grass clipping produced by a lawnmower has a width of about 1/16 to 3/8 inch. Length is more variable, but is typically at least 1/16 inch. A scraper distance of about 1/8 to 5/16 inch is small enough to effectively prevent the accumulation of clumps. Only a small number of grass clippings are likely to lie flat enough against the wheel surface to avoid removal. No necessity exists to remove all of the clippings from the wheel surface; only clumps need to be removed or broken up. Scraper distances of 1/8 to 5/16 inch are large enough to avoid contact with the wheel surface even when the lawnmower is jostled or the scraper is bumped.

The scraper distance is uniform for both lateral edges. Preferably the scraper distance is equal for both lateral edges, as in FIG. 5. However, the scraper distance may vary by a small amount, preferably no more than ⅛ inch (3 mm). The uniform scraper distance allows the scraper to remove excess grass clippings when the wheel turns in either direction. Many prior art wheel scrapers are designed for use on tractors, bicycles, and automobiles, in which the wheels turn in a single direction virtually all of the time. Lawnmowers, however, frequently move backwards when negotiating around obstacles and mowing small spaces. It is therefore important that the scraper device remove excess clippings from the wheels, no matter which direction the wheels turn.

Figure 4:
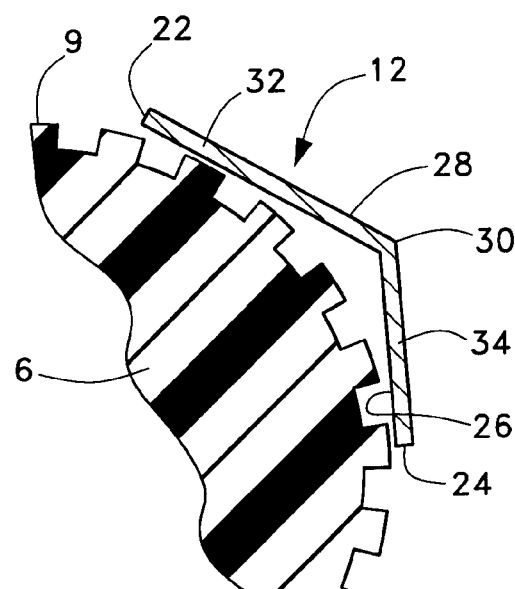
FIG. 4 is a detail, fragmented, vertical section view of a scraper having a scraper fold line.

The scraper 12 has an inner surface 26 and an opposite outer surface 28. The inner surface 26 is of predetermined configuration, either angled (FIG. 4) or concave (FIG. 5), and located near the wheel surface 9. With reference to FIG. 4, the scraper 12 may have a scraper fold line 30 dividing it into a first section 32 and a second section 34, as in FIG. 4. The scraper fold line 30 extends parallel to the first and second lateral edges 22 and 24. The scraper fold line may be a relatively sharp fold, or the edge may be rounded. The first and second sections 32 and 34 extend from the scraper fold line 30 to the first and second lateral edges 22 and 24 respectively. The scraper fold line is relatively shallow, preferably no further than ⅛ inch from a plane extending between the first and second lateral edges, most preferably about ¹⁄₁₆ inch.

In a preferred embodiment, each of the first and second sections 32 and 34 is substantially flat. See FIG. 4. Preferably the first section 32 is wider than the second section 34. The first section may be about twice the width of the second section, as shown in FIG. 4. The first section 32 and the second section 34 define a fold angle. The fold angle ranges from about 140° to about 165°, preferably about 120° to 150°.

The lateral edges are preferably the closest point of the scraper to the wheel surface, as shown in FIG. 4 for the second lateral edge 24. However, precision is not required, and the closest point may be slightly back from the lateral edge, as in FIG. 4 for the first lateral edge 22. The configuration of two angled sections helps grass clippings to fall evenly from the scraper as the wheels turn in either direction.

Figures 2A, 2B:
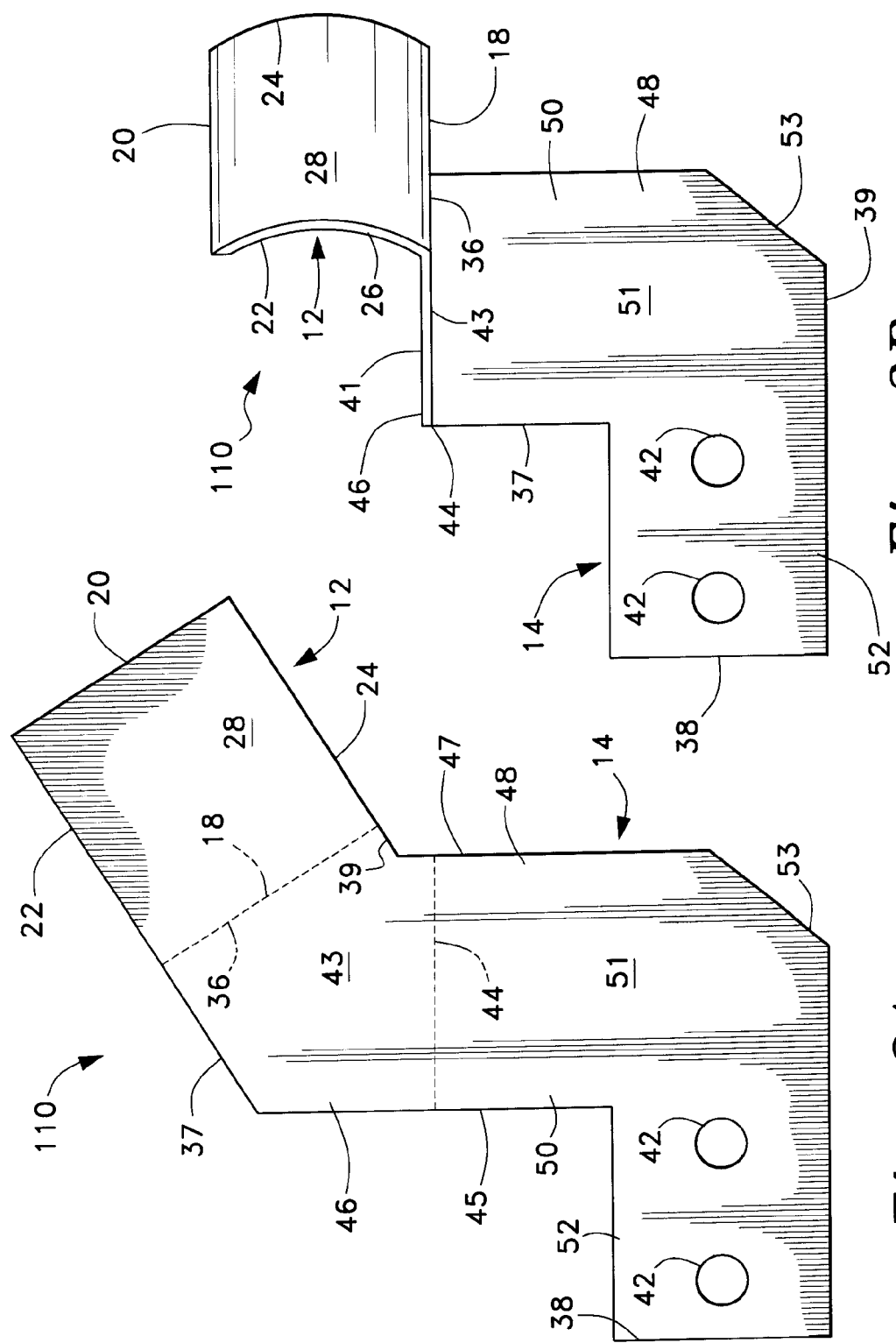
FIG. 2A is a top plan view of a scraper device having an L-shaped housing portion, prior to folding.
FIG. 2B is a top plan view of a scraper device having an L-shaped housing portion, after folding.
Figure 5:
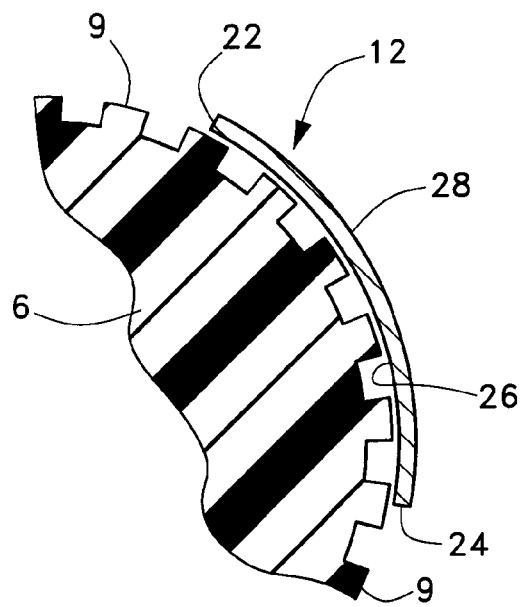
FIG. 5 is a detail, fragmented, vertical section, side view of a scraper having a curved inner surface.

Again, the scraper 12 may have a predetermined inner configuration that is a curved inner surface 26, as in FIGS. 2B and 5. The curve may follow the contour of the wheel surface 9. This arrangement minimizes the amount of materials used. Preferably the deepest part of the curve is no further than ⅛ inch from a plane extending between the first and second lateral edges, most preferably ¹⁄₁₆ inch.

The arm 14 of the scraper device has a scraper end 36 and an attachment end 38. The scraper end 36 attaches to the proximal edge 18 of the scraper. The arm 14 and the scraper 12 are integrally attached. The arm is composed of the same rigid material as the scraper. Preferably the arm and the scraper are cut or stamped together from the same thin sheet of metal, reducing manufacturing costs.

The scraper device includes attachment means for attaching the attachment end 38 of the arm 14 to the housing 16 near the wheel 6. The attachment means may be a weld or any of a variety of fasteners. In a preferred embodiment, the attachment means includes two bolts 40 removably attaching the attachment end of the arm to the housing. See FIG. 1. The arm 14 has at least two bolt apertures 42 through which the bolts 40 pass. See FIGS. 2A and 2B. The diameter of the bolt apertures is preferably about ³⁄₁₆ inch. Ideally one bolt aperture is located about ⅜ inch to ½ inch from the attachment end 38. The other bolt aperture may be located about 1¼ inch to 1⅝ inch from the attachment end.

In a preferred embodiment, the arm 14 has an arm fold line 44 dividing the arm into a wheel portion 46 and a housing portion 48. See FIGS. 1–3. The wheel portion has first and second lateral edges 37 and 39, and inner and outer surfaces 41 and 43. The housing portion has first and second lateral edges 45 and 47, and inner and outer surfaces 49 and 51. See FIGS. 2A, 2B, and 3. Preferably the wheel portion 46 is located near the inner side of the wheel, with the inner surface 41 of the wheel portion adjacent to the inner side 13 of the wheel. See FIG. 1.

In a preferred embodiment 110, the outer surface 43 of the wheel portion 46 is at an angle of about 90° to the outer surface 28 of the scraper 12. The outer surface 51 of the housing portion 48 is at an angle of about 90° to the outer surface 43 of the wheel portion 46. See FIGS. 1, 2A, and 2B. The housing portion 48 is substantially flat and includes two parts 50 and 52. The parts 50 and 52 of the housing portion are approximately perpendicular to each other, so that the housing portion is L-shaped. The corner 53 of the base of the L at the second lateral edge 47 of the housing portion may be rounded or removed, as in FIGS. 2A and 2B. This allows for an easier fit with the lawnmower.

FIG. 2A shows the configuration of embodiment 110 prior to folding at the arm fold line 44 and the scraper end 36. FIG. 2B shows the folded scraper device. The same configuration may be used to form scraper devices for either a left or a right wheel, depending on which direction the folding is done. FIG. 2B shows a configuration suitable for attachment near the trailing edge 19 of a right wheel. A mirror image would be suitable for attachment near the trailing edge of a left wheel.

Ideally the wheel portion 46 of the embodiment 110 is V-shaped, as shown in FIG. 2A. When the arm is bent at the scraper end 36 and the fold line 44, the V-shaped wheel portion places the scraper 12 at an angle adjacent to the wheel. See FIG. 2B. An angle of about 120° between the two sides of the V is suitable, as shown in FIG. 2A.

Suitable dimensions for the embodiment 110 will vary somewhat according to the size of the lawnmower and the wheels. For the standard lawnmower, the scraper preferably has dimensions of about 1¾ inches by 1⅝ inches. The attachment end 38 of the housing portion has a width of 1⅜ inches. The parts of the L-shaped housing portion have lengths of 1½ inches for the part 52 beginning from the attachment end 38, and 2½ inches for the part 50 ending at the wheel portion 46. The V-shaped wheel portion preferably has a length of about 1⅛ inch for both sides of the V at the first lateral edge 37.

The embodiment 110 is well suited for attachment to a flat upper surface of the housing 16, as shown in FIG. 1. It provides a solid attachment which is easily retrofitted to an existing lawnmower. The embodiment 110 is particularly well suited for the front wheels of a lawnmower. The scraper is easily located near the trailing edge of a front wheel or in other suitable positions.

Figure 3:
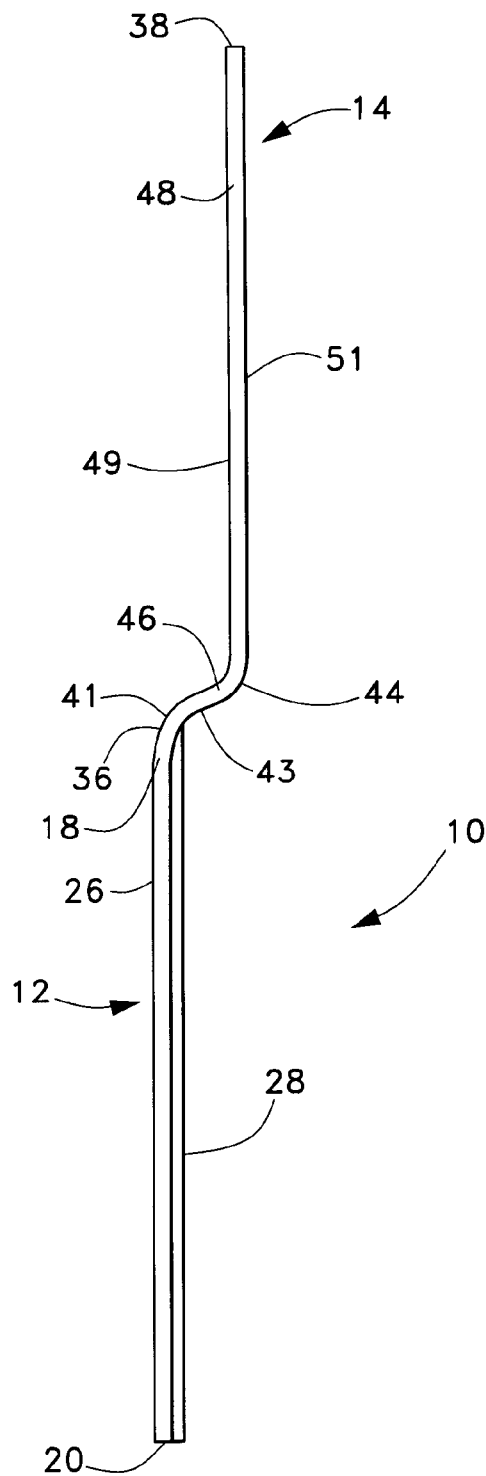
FIG. 3 is a side view of a scraper device having a straight housing portion.

In an alternative embodiment 10, shown in FIGS. 1 and 3, the outer surface 43 of the wheel portion is at an angle of about 135° to the outer surface 28 of the scraper. The outer surface 51 of the housing portion is at an angle of about 135° to the outer surface 43 of the wheel portion. The housing portion 48 is substantially flat and straight, and extends generally parallel to the scraper 12. The embodiment 10 is well suited for attachment to a vertical surface of the housing 16. The embodiment 10 can be easily retrofitted to standard lawnmowers, and is particularly useful for attachment adjacent to the rear wheels.

The dimensions of the embodiment 10 may also vary. For standard lawnmowers, the scraper 12 preferably has a length of about 2½ inches. The width of the scraper is about 1⅝ inches. The lengths of the housing portion 48 and the wheel portion 46 are about 2¼ inches and ½ inch respectively.

The scraper device provides a simple way to avoid the release of irregular clumps of grass clippings from lawnmower wheels. The lateral edges of the scraper follow the wheel surface closely enough that most of the grass blades are removed continuously as the wheel turns. In dry conditions, the scraper device will typically remove all or nearly all of the grass blades, despite the lack of actual contact with the wheel. In wet conditions, the scraper will still remove a sufficient amount of grass blades from the wheel to prevent the release of clumps. Jamming and binding against the wheel surface is avoided, and the device is durable in use.

After mowing, the lawn has a neat appearance. Clumps of grass do not block sunlight to the lawn below them. Raking is not required to remove clumps. The clippings are spread evenly, so that they can be left on the lawn as mulch without spoiling the lawn's appearance. The clippings are better exposed to the air and the elements, so that they decompose rapidly.

The invention also includes a lawnmower assembly having a lawnmower and four scraper devices. The lawnmower has a pair of front wheels 7 and a pair of rear wheels 5. The scraper devices preferably include two front scraper devices and two rear scraper devices. Each front scraper device is attached to the housing near one of the front wheels 7. The outer surface of the wheel portion of each front scraper device is preferably at an angle of about 90° to the outer surface of the scraper. The outer surface of the housing portion of each front scraper device is at an angle of about 90° to the outer surface of the wheel portion. The housing portion of each front scraper device is substantially flat and includes two parts approximately perpendicular to each other. The housing portion of each front scraper device is L-shaped (FIG. 1).

Each rear scraper device is attached to the housing near one of the rear wheels 5. The outer surface of the wheel portion of each rear scraper device is preferably at an angle of about 135° to the outer surface of the scraper to which it is attached. The outer surface of the housing portion of each rear scraper device is at an angle of about 135° to the outer surface of the wheel portion. The housing portion of each rear scraper device is substantially flat and straight and extends generally parallel to the corresponding scraper.

The invention includes a method for improving lawn appearance by preventing irregular release of grass clippings from a wheel of a lawnmower. The method includes a step of attaching a scraper device to the lawnmower. The next step is mowing a lawn with the lawnmower. The scraper removes at least a part of the grass clippings produced by the lawnmower from the wheel as the wheel turns in forward and reverse directions.

It is to be understood that the present invention is not limited to the sole embodiments described above, but encompasses any and all embodiments within the scope of the following claims

I claim:

1. A scraper device to prevent irregular release of grass clippings from a wheel of a lawnmower, the wheel having a wheel surface, the lawnmower having a housing, the device comprising:

a scraper having a proximal edge, a distal edge, a first lateral edge, a second lateral edge, an inner surface, and an opposite outer surface, the inner surface of the scraper being of predetermined configuration and located near the wheel surface, the first and second lateral edges being separated from the wheel surface by a uniform scraper distance, the length of the scraper from the proximal edge to the distal edge being approximately equal to the width of the wheel;

an arm having a scraper end and an attachment end, the scraper end attaching to the proximal edge of the scraper, the arm and the scraper being integrally attached and composed of a rigid material; and attachment means for attaching the attachment end of the arm to the housing near the wheel;

wherein the scraper has a scraper fold line dividing the scraper into a first section and a second section, the scraper fold line extends parallel to the first and second lateral edges, each of the first and second sections of the scraper is substantially flat, the width of the first section is greater than the width of the second section, the first section is located at a fold angle from the second section, and the fold angle ranges from about 140 degrees to about 165 degrees.

2. The scraper device according to claim 1, wherein the rigid material is selected from the group consisting of metal and plastic, and the rigid material has a thickness of about 1/16 inch.

3. The scraper device according to claim 2, wherein the rigid material is steel.

4. The scraper device according to claim 1, wherein the width of the scraper ranges from about ⅙ to about ¼ of the diameter of the wheel.

5. The scraper device according to claim 1, wherein said uniform scraper distance ranges from 3 to 7 millimeters.

6. The scraper device according to claim 1, wherein the inner surface configuration of the scraper is curved.

7. The scraper device according to claim 1, wherein the wheel has a trailing edge, the scraper is located near the trailing edge of the wheel, and the scraper is oriented vertically.

8. The scraper device according to claim 1, wherein the attachment means includes two bolts removably attaching the attachment end of the arm to the housing.

9. The scraper device according to claim 1, wherein the arm has an arm fold line dividing the arm into a wheel portion and a housing portion, the wheel portion has an inner surface and an outer surface, and the housing portion has an inner surface and an outer surface.

10. The scraper device according to claim 9, wherein the outer surface of the wheel portion is at an angle of about 90 degrees to the outer surface of the scraper, the outer surface of the housing portion is at an angle of about 90 degrees to the outer surface of the wheel portion, the housing portion is substantially flat and includes two parts, and the parts of the housing portion are approximately perpendicular to each other, so that the housing portion is L-shaped.

11. The scraper device according to claim 9, wherein the outer surface of the wheel portion is at an angle of about 135° to the outer surface of the scraper, the outer surface of the housing portion is at an angle of about 135° to the outer surface of the wheel portion, and the housing portion is substantially flat and straight and extends generally parallel to the scraper.

12. A lawnmower assembly, comprising in combination:

(a) a lawnmower having a housing, a pair of front wheels, and a pair of rear wheels, each of the front and rear wheels having a wheel surface and a trailing edge;

(b) four scraper devices, each scraper device being located near one of the wheels, each scraper device having:

(i) a scraper having a proximal edge, a distal edge, a first lateral edge, a second lateral edge, an inner surface, and an opposite outer surface, the inner surface of the scraper being of a predetermined configuration and located near the wheel surface of the corresponding wheel, the lateral edges being separated from the wheel surface of the corresponding wheel by a uniform scraper distance ranging from 3 to 7 millimeters, the length of the scraper from the proximal edge to the distal edge being approximately equal to the width of the corresponding wheel;

(ii) an arm having a scraper end and an attachment end, the scraper end attaching to the proximal edge of the scraper, the arm and the scraper being integrally attached and composed of a rigid material, the rigid material being selected from the group consisting of metal and plastic; and (iii) attachment means for attaching the attachment end of the arm to the housing near the corresponding wheel;

wherein the arm has an arm fold line dividing the arm into a wheel portion and a housing portion, the wheel portion has an inner surface and an outer surface, and the housing portion has an inner surface and an outer surface;

wherein the scraper devices include two front scraper devices, each front scraper device is attached to the housing near one of the front wheels, the outer surface of the wheel portion of each front scraper device is at an angle of about 90 degrees to the outer surface of the scraper to which it is attached, the outer surface of the housing portion of each front scraper device is at an angle of about 90 degrees to the outer surface of the wheel portion to which it is attached, the housing portion of each front scraper device is substantially flat and includes two parts, and the two parts of the housing portion of each front scraper device are approximately perpendicular to each other, so that the housing portion of each front scraper device is L-shaped.

13. A scraper device to prevent irregular release of grass clippings from a wheel of a lawnmower, the wheel having a wheel surface, the lawnmower having a housing, the device comprising:

a scraper having a proximal edge, a distal edge, a first lateral edge, a second lateral edge, an inner surface, and an opposite outer surface, the inner surface of the scraper being of predetermined configuration and located near the wheel surface, the first and second lateral edges being separated from the wheel surface by a uniform scraper distance, the length of the scraper from the proximal edge to the distal edge being approximately equal to the width of the wheel;

an arm having a scraper end and an attachment end, the scraper end attaching to the proximal edge of the scraper, the arm and the scraper being integrally attached and composed of a rigid material; and attachment means for attaching the attachment end of the arm to the housing near the wheel;

wherein the arm has an arm fold line dividing the arm into a wheel portion and a housing portion, the wheel portion has an inner surface and an outer surface, and the housing portion has an inner surface and an outer surface;

wherein the outer surface of the wheel portion is at an angle of about 90 degrees to the outer surface of the scraper, the outer surface of the housing portion is at an angle of about 90 degrees to the outer surface of the wheel portion, the housing portion is substantially flat and includes two parts, and the parts of the housing portion are approximately perpendicular to each other, so that the housing portion is L-shaped.

\* \* \* \* \*